Patented Feb. 3, 1948

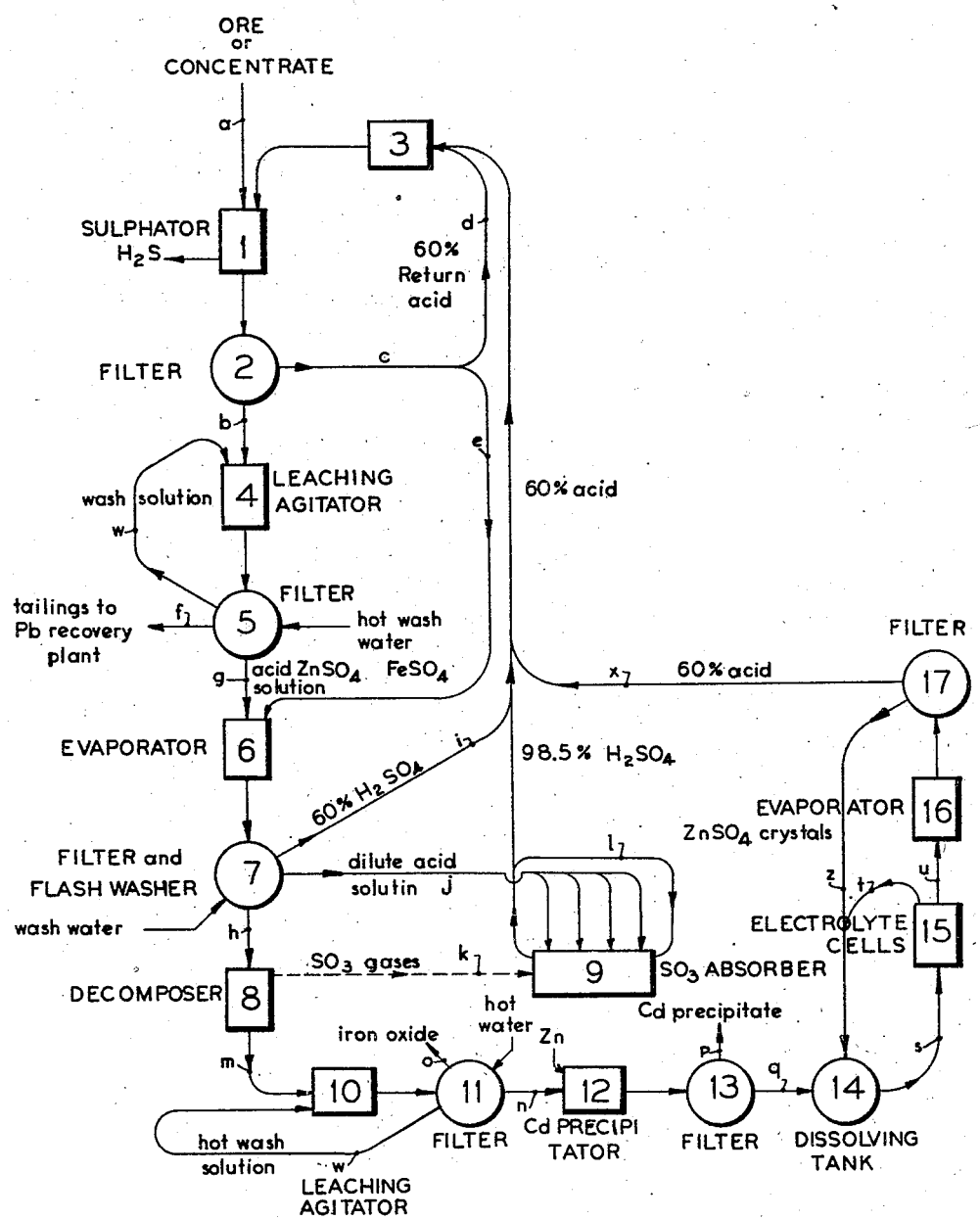

2,435,340

UNITED STATES PATENT OFFICE 2,435,340

PROCESS FOR THE TREATMENT OF MARMATITIC ZINC ORES

Niels C. Christensen, Salt Lake City, Utah, assignor to Combined Metals Reduction Company, Salt Lake City, Utah, a corporation of Utah Application May 1, 1944, Serial No. 533,633

5 Claims. (Cl. 204—119)

This invention relates to the treatment of zinc sulphide concentrates in which the zinc mineral contains relatively large percentages of FeS i. e. ores in which the zinc mineral is marmatite or contains sufficient FeS to be classed as marmatitic. The treatment of such ores by ordinary electrolytic methods in which the concentrates are roasted and leached with $H_2SO_4$ and the solution is electrolyzed for the recovery of the zinc is difficult or uneconomic due to the formation of an excessive amount of zinc ferrite in the roasting operation and the dissolving of an excessive amount of iron in the leaching operation. By the process of this invention the difficulties of the roasting operation are eliminated and the iron is eliminated from solution without the difficult and cumbersome precipitation and washing step required in the commonly used electrolytic process of zinc-recovery. In the process of this invention the zinc sulphide concentrates are leached with sulphuric acid in their natural state and the dissolved iron is separated from the $ZnSO_4$ by a calcining and leaching operation in which the iron is changed to ferric oxide and the $SO_3$ is recovered for use in the process and the pure zinc sulphate is electrolyzed in a relatively strong acid electrolyte of substantially constant composition. The accompanying flow sheet illustrates the method of carrying out the process which is set forth in detail in the following description.

The zinc concentrates $a$ are ground with an excess of sulphuric acid of approximately 60% concentration in a silex lined pebble mill 1 (marked sulphator on the flow sheet) to convert the lead and zinc sulphides to sulphates. As fully set forth in my U. S. Patents Nos. 1,434,084 and 1,937,633 hot sulphuric acid at a concentration of approximately 60% $H_2SO_2$ acts upon the ZnS to form $ZnSO_4$ and $H_2S$ as indicated in the following chemical equation:

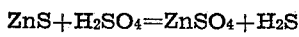

$$ZnS + H_2SO_4 = ZnSO_4 + H_2S$$

As also fully set forth in the above-mentioned patents, the solubility of $ZnSO_4$ in $H_2SO_4$ is at a minimum in sulphuric acid containing in the neighborhood of 60% $H_2SO_4$, and it is therefore necessary to subject the mixture of concentrates and hot acid to grinding or attrition to remove the coating of $ZnSO_4$ from the zinc sulphide particles and permit the reaction to go to completion and convert all the ZnS to $ZnSO_4$. The FeS in the zinc mineral is also converted to $FeSO_4$ by this treatment and as the solubility of the $FeSO_4$ is also at a minimum in sulphuric acid and of a concentration in the neighborhood of 60% $H_2SO_4$, the grinding operation in the sulphator 1 results in the conversion of both the ZnS and FeS to solid $ZnSO_4$ and $FeSO_4$. The galena in the ore is also converted to $PbSO_4$ in the same manner. The pyrite in the ore, as also set forth in the above mentioned patents, is not acted upon by acid of a concentration in the neighborhood of 60% $H_2SO_4$. Sufficient excess hot acid is used in the grinding operation to form a fluid pulp and to prevent the lowering of the concentration of the $H_2SO_4$ in the acid below the point at which the acid acts upon the zinc sulphide mineral. With most ores of the marmatitic type a treatment period of one half hour is sufficient to convert substantially all the ZnS and FeS in the zinc mineral to $ZnSO_4$ and $FeSO_4$. To prevent lowering of the $H_2SO_4$ concentration in the sulphating operation below the point at which the acid does not act effectively upon the zinc sulphide mineral, the concentration of the incoming acid is made sufficiently above 60% to take care of the acid lost in the formation of the sulphates in the sulphating operation.

The mixture of ore residue and solid sulphates $b$ is separated from the excess or circulating acid $c$ on the filter 2 part of the excess acid $d$ being passed through the heater 3 and returned to the sulphator 1 for use in treating more zinc concentrate and the remainder of the excess acid $e$ being sent to the evaporator 6, and the mixture of ore residue and solid sulphates and residual acid $b$ is mixed with sufficient hot wash solution from the filter 5 to dissolve the $ZnSO_4$ and $FeSO_4$ in the acid solution and form a hot concentrated sulphate solution. The ore residue $f$ containing the Au and silver sulphide and $PbSO_4$ is separated from the acid sulphate solution $g$ and washed with hot water on the filter 5, the ore residue and $PbSO_4$, $Ag_2S$ and Au being sent to the lead smelter or lead leaching plant for recovery of the Pb and Au and Ag, while the acid $ZnSO_4$-$FeSO_4$ solution $g$ is mixed with circulating acid $e$ from the filter 2 and concentrated in the evaporator 6 to bring the acid concentration to approximately 60% $H_2SO_4$ and thus precipitate the greater part of the ZnSO4 and FeSO4 from the solution. (Sufficient circulating acid e is added to the acid ZnSO4 solution g to carry the precipitated ZnSO4 and FeSO4 crystals in suspension in the evaporator, and the hot wash solution j is used to form H2SO4 with the SO3 from the decomposer 8 as later described.) The mixture of solid ZnSO4 and FeSO4 h is separated from the concentrated sulphuric acid solution i (approximately 60% H2SO4) on the filter 7 and the greater part of the H2SO4 is washed out of the filter cake of mixed sulphate crystal by a flash wash with water, the wash solution j being used to make H2SO4 from the SO3 supplied to the absorber 9 from the decomposing furnace 8 (indicated as decomposer on the flow sheet). The washed mixed ZnSO4 and FeSO4 crystals are dried and heated with air in the decomposing furnace at a temperature of 500–600° C. to drive off the residual acid and to decompose the FeSO4 to secure SO3 and ferric oxide as indicated in the following chemical equation:

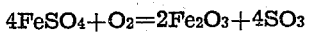

$$4FeSO_4 + O_2 = 2Fe_2O_3 + 4SO_3$$

The decomposition is carried out in a multiple hearth muffle type furnace, the mixed sulphates and residual H2SO4 being fed to the top hearth and passed downward through successive hearths in counter-current to the air which is passed upward through the furnace, the upper hearth being maintained at a temperature of approximately 400° C. and the temperature increasing successively on lower hearths to approximately 600° C. on the lowest hearth. In the passage of the mixed sulphates through the decomposing furnace the FeSO4 is completely decomposed whereas the ZnSO4 is not affected. The SO3 k gases from the decomposing furnace 8 are absorbed in the spray absorber 9 in the concentrated circulating acid l, the wash solution j from the filter 7 being added to the circulating acid at successive points of solution flow in the absorber so as to maintain the acid concentration in the absorber at substantially 98.5% H2SO4. The concentrated H2SO4 from the absorber 9 is mixed with the 60% acid i and returned to the sulphator 1 for use in sulphating the concentrates.

The mixture of ZnSO4 and Fe2O3 m is leached with hot wash solution from the filter 11 in the leaching agitator 10 to dissolve the ZnSO4 and form a hot concentrated ZnSO4 solution. The Fe2O3 o is separated from the hot concentrated ZnSO4 solution n on the filter 11 and washed with water, the wash solution being sent to the leaching agitator 10 and the hot saturated ZnSO4 solution n is treated with zinc dust in the Cd precipitator 12 to precipitate the Cd (and the other impurities such as Cu and Ag) from solution. The Cd precipitate p is separated from the ZnSO4 solution in the filter 13 and the purified ZnSO4 solution q is mixed with ZnSO4 crystals from the filter 17 and return solution t from the electrolytic cells 15 in the mixing tank 14 and this mixed electrolyte s is electrolyzed in the electrolytic cells 15 to recover the zinc as metal and regenerate the H2SO4. The electrolyte in the cell circuit is maintained at the desired acid and zinc concentration by rapidly and continuously circulating the electrolyte through the cells, through the mixing tank 14 and back through the cells as indicated on the flow sheet, the electrolyte being cooled to the desired temperature in the mixing and dissolving tank 14 in each circulating cycle. From this circulating electrolyte t sufficient electrolyte u is continuously withdrawn to remove the amount of acid generated by decomposition of the ZnSO4. This withdrawn electrolyte u is concentrated in the evaporator 16 to bring the acid concentration to approximately 60% H2SO4 and thus precipitate the zinc as ZnSO4. The crystals of ZnSO4 z are separated from the H2SO4 on the filter 17, the crystals and adhering acid being returned to the dissolving and mixing tank 14 and the approximately 60% acid x being sent to the sulphator 1 for use in treating more zinc concentrates. The acid concentration in the electrolytic circuit is maintained at the maximum which is possible for efficient operation so as to keep the amount of evaporation required in the evaporator 16 at the minimum.

By the process described above the sulphuric acid required in the process is regenerated and recovered for reuse in the process with the exception of the relatively small amount of loss in the form of SO2 made in the decomposition of the FeSO4. This loss must be made up by supplying this amount of acid to the leaching operation. The process as described makes it possible to treat the marmatitic zinc ores without roasting, recovers the sulphur as H2S which may be utilized as such or from which the sulphur may be recovered as metallic sulphur, and allows the recovery of the zinc as metal by electrolysis in a high acid electrolyte of substantially constant conditions especially favorable to efficient operation.

What is claimed is:

1. The process of treating marmatitic zinc sulphide ores and concentrates which consists in grinding said ores or concentrates with an excess of hot sulphuric acid containing in the neighborhood of 60% H2SO4 so as to convert the ZnS and FeS in the zinc mineral in said ores or concentrates to solid ZnSO4 and FeSO4 and drive off the sulphur as H2S, separating the excess acid from the solid sulphates and ore residue and using said excess acid in the treatment of more ore or concentrate, leaching said mixture of ore residue and solid sulphates with hot water to form a concentrated solution of sulphates, separating said sulphate solution from the ore residue, adding 60% H2SO4 in sufficient amount to carry in suspension the solid sulphates formed in the subsequent concentrating operation, evaporating said last solution to bring the acid concentration therein to approximately 60% H2SO4 so as to precipitate ZnSO4 and FeSO4 from said acid solution, separating the precipitated sulphate crystals from the concentrated acid and using said acid for the treatment of more ore or concentrate, heating the mixture of crystals of ZnSO4 and FeSO4 in the presence of oxygen to decompose the FeSO4 and form Fe2O3 and SO3, absorbing the SO3 in concentrated acid to form concentrated H2SO4 and using said acid in the treatment of more ore or concentrate, leaching the mixture of Fe2O3 and ZnSO4 with hot water to form a concentrated ZnSO4 solution, separating the Fe2O3 from the ZnSO4 solution, treating the hot ZnSO4 solution with Zn to precipitate metals below zinc in the electromotive series, separating the precipitated metals from said solution, mixing the purified ZnSO4 solution with sulfuric acid electrolyte from an electrolytic cell and with precipitated ZnSO4 crystals to form an electrolytic solution, electrolyzing the latter in the aforementioned electrolytic cell to recover zinc therefrom and form H2SO4 in solution, removing a portion of the electrolyzed solution, concentrating said portion to raise the concentration of acid therein to approximately 60% $H_2SO_4$ and thereby precipitate the $ZnSO_4$ crystals therefrom, separating the $ZnSO_4$ crystals from said concentrated acid, using said concentrated acid in treating more ore or concentrate as described, and using said separated $ZnSO_4$ crystals together with another portion of the electrolyzed solution for mixing with more purified $ZnSO_4$ solution to form an additional quantity of electrolytic solution for electrolysis.

2. The process for treating marmatitic zinc sulphide ores and concentrates for the recovery of the zinc therefrom which consists, in grinding said ores and concentrates with an excess of hot sulphuric acid containing in the neighborhood of 60% $H_2SO_4$ so as to convert the ZnS and FeS in the zinc mineral in said ores or concentrates to solid $ZnSO_4$ and $FeSO_4$ and drive off the sulphur as $H_2S$, separating the excess acid from said solid sulphates and ore residue and using said acid in the treatment of more ore or concentrate, leaching said mixture of ore residue and sulphates with hot wash solution from the subsequent filtering and washing operation to form a concentrated sulphate solution, mixing said solution with 60% $H_2SO_4$ in sufficient amount to carry in suspension the solid sulphates precipitated in the subsequent concentrating operation, evaporating said last solution to bring the acid concentration therein to approximately 60% $H_2SO_4$ so as to precipitate $ZnSO_4$ and $FeSO_4$ from said acid solution, separating the precipitated sulphate crystals from the concentrated acid and flash washing the filter cake of said crystals with water to remove the greater part of the residual $H_2SO_4$, using said concentrated acid to treat more ore or concentrate, and using said wash solution in the absorption of $SO_3$ from the decomposition of $FeSO_4$ as described below, heating the mixture of crystals of $ZnSO_4$ and $FeSO_4$ in the presence of oxygen to drive off the residual $H_2SO_4$ and decompose the $FeSO_4$ to form $Fe_2O_3$ and $SO_3$, absorbing said $SO_3$ in the presence of said wash solution to form concentrated $H_2SO_4$ and using said acid in the treatment of more ore or concentrate, leaching the mixture of $Fe_2O_3$ and $ZnSO_4$ from said decomposing operation with wash solution from the subsequent filtering and washing operation to form a hot concentrated $ZnSO_4$ solution, separating the $Fe_2O_3$ from the hot $ZnSO_4$ solution and washing the $Fe_2O_3$ with hot water and using the wash solution in leaching more $Fe_2O_3$-$ZnSO_4$ mixture as described, treating the hot $ZnSO_4$ solution with zinc to precipitate metals below zinc in the electromotive series and separating the precipitated metals from said solution, mixing said solution with sulfuric acid electrolyte from an electrolytic cell and with precipitated $ZnSO_4$ crystals to form an electrolytic solution, electrolyzing the latter in the aforementioned electrolytic cell to recover zinc therefrom and form $H_2SO_4$ in solution, removing a portion of the electrolyzed solution, concentrating said portion to raise the concentration of acid therein to approximately 60% $H_2SO_4$ and thereby precipitate the $ZnSO_4$ crystals therefrom, separating the $ZnSO_4$ crystals from said concentrated acid, using said concentrated acid in treating more ore or concentrate as described, and using said separated $ZnSO_4$ crystals together with another portion of the electrolyzed solution for mixing with more purified $ZnSO_4$ solution to form an additional quantity of electrolytic solution for electrolysis.

3. In the treatment of marmatitic zinc sulphide ores or concentrates the steps which consist in, grinding the said ores or concentrates in their chemically unchanged state with an excess of hot sulphuric acid containing in the neighborhood of 60% $H_2SO_4$, thereby converting the ZnS and FeS in the zinc material in said ores or concentrates to solid $ZnSO_4$ and $FeSO_4$ and driving off the sulphur as $H_2S$, separating the excess acid from the solid sulphates and ore residue and using said acid in the treatment of more ore or concentrate, leaching the mixture of ore residue and solid sulphates with hot water to form a concentrated sulphate solution, adding $H_2SO_4$ to said solution and concentrating the acid solution to bring the acid concentration to approximately 60% $H_2SO_4$ and thereby precipitate the $ZnSO_4$ and $FeSO_4$ from the acid solution, separating said sulphate crystals from said acid and using said acid in the treatment of more ore or concentrate, calcining said mixture of sulphate crystals in the presence of oxygen at a temperature below the temperature of decomposition of the $ZnSO_4$ to decompose the $FeSO_4$ and form iron oxide and $SO_3$ and leave the zinc in the form of sulphate, absorbing said $SO_3$ in a concentrated $H_2SO_4$ solution to form more $H_2SO_4$, using said last $H_2SO_4$ in treating more ore or concentrate and leaching said mixture of iron oxide and $ZnSO_4$ with water to form a concentrated $ZnSO_4$ solution and separating said solution from the iron oxide.

4. In the treatment of marmatitic zinc sulphide ores or concentrates the steps which consist in, grinding the said ores or concentrates with an excess of hot sulphuric acid containing in the neighborhood of 60% $H_2SO_4$, thereby converting the ZnS and FeS in the zinc material in said ores or concentrates to solid $ZnSO_4$ and $FeSO_4$ and driving off the sulphur as $H_2S$, separating the excess acid from the solid sulphates and ore residue and using said acid in the treatment of more ore or concentrate, leaching the mixture of ore residue and solid sulphates with hot water to form a concentrated sulphate solution, adding $H_2SO_4$ to said solution and concentrating the acid solution to bring the acid concentration to approximately 60% $H_2SO_4$ and thereby precipitate the $ZnSO_4$ and $FeSO_4$ from the acid solution, separating said sulphate crystals from said acid and using said acid in the treatment of more ore or concentrate, calcining said mixture of sulphate crystals in the presence of oxygen at a temperature below the temperature of decomposition of the $ZnSO_4$ to decompose the $FeSO_4$ and form iron oxide and $SO_3$ and leave the zinc in the form of sulphate and absorbing said $SO_3$ in a concentrated $H_2SO_4$ solution to form more $H_2SO_4$, using said last $H_2SO_4$ in treating more ore or concentrate, leaching said mixture of iron oxide and $ZnSO_4$ with water to form a concentrated $ZnSO_4$ solution, separating said solution from the iron oxide, purifying said $ZnSO_4$ solution and electrolyzing the pure $ZnSO_4$ solution to recover the zinc therefrom and form $H_2SO_4$, concentrating electrolyte containing said $H_2SO_4$ to approximately 60% $H_2SO_4$ to precipitate the $ZnSO_4$ therefrom and separating the $ZnSO_4$ crystals from said acid, using said acid in the treatment of more ore concentrate, and returning the $ZnSO_4$ crystals to the electrolytic circuit with more purified $ZnSO_4$ solution for electrolysis.

5. A process according to claim 3 in which the concentrated $ZnSO_4$ solution is electrolyzed in a relatively strong acid electrolyte of substantially constant composition to recover zinc as metal and regenerate the $H_2SO_4$ to treat more ore or concentrate.

NIELS C. CHRISTENSEN.

REFERENCES CITED

The following references are of record in the file of this patent:

UNITED STATES PATENTS

| Number | Name | Date |
|---|---|---|
| 203,849 | Parnell | May 21, 1878 |
| 880,775 | De Bechi | Mar. 3, 1908 |
| 914,649 | Evans | Mar. 9, 1909 |
| 1,779,841 | Fischer | Oct. 28, 1930 |
| 1,937,633 | Christensen | Dec. 5, 1933 |
| 2,001,409 | Christensen | May 14, 1935 |
| 2,007,233 | Wespy | July 9, 1935 |

OTHER REFERENCES

Lunge, "Sulphuric Acid and Alkali," fourth edition, vol. 1, part 3, page 1338. Gurney and Jackson, London, (1913).